United States Patent [19]

Shirota et al.

[11] 4,181,430

[45] Jan. 1, 1980

[54] METHOD AND APPARATUS FOR OPTICAL METHOD OF MEASURING RAIL DISPLACEMENT

[75] Inventors: Yasushi Shirota, Yokohama; Satoru Kishimoto, Higashikurume; Kunio Takeshita, Hachioji; Yoshio Ando, Fujisawa, all of Japan

[73] Assignee: Japanese National Railways, Tokyo, Japan

[21] Appl. No.: 659,556

[22] Filed: Feb. 19, 1976

[30] Foreign Application Priority Data

Mar. 5, 1975 [JP] Japan ................... 50/26019

[51] Int. Cl.$^2$ .................... G01C 3/00; E01B 29/04
[52] U.S. Cl. ...................... 356/1; 33/287; 356/4; 356/375
[58] Field of Search .................... 33/287, 1 Q, 144; 356/156, 167, 172, 1, 4, 375, 400

[56] References Cited

U.S. PATENT DOCUMENTS

| | | | |
|---|---|---|---|
| 3,864,039 | 2/1975 | Wilmarth | 356/172 |
| 3,869,907 | 3/1975 | Plasser et al. | 33/144 |

FOREIGN PATENT DOCUMENTS 1369846  10/1974  United Kingdom ............ 356/167

OTHER PUBLICATIONS

Michael, W., "All-Weather Gage Measuring Systems", Report No. DOT-FR-74-09, U.S. Department of Transportation, Federal Railroad Administration, Washington, D. C., May 1975, pp. 3, 31–32, D1–D10.

*Primary Examiner*—John K. Corbin
*Assistant Examiner*—R. A. Rosenberger
*Attorney, Agent, or Firm*—Wenderoth, Lind & Ponack

[57] ABSTRACT

For optically measuring rail displacement, a light projector with a slit plate, a reflection mirror for light projection, a reflection mirror for light reception and a light receptor with a slit plate are installed at specified distances from one another on the underside of the body of a track inspection car on both sides in the longitudinal direction thereof. The light projector, the reflection mirror for light projection, the reflection mirror for light reception and the light receptor are arranged so that the light emitted from the light source in the light projector passes through the slit and, being reflected by the reflection mirror for light projection, is converged onto a measuring axis connecting the points as to which measurement is being made on the opposed rails which constitute the track at at least one of the rails to form a bright spot or band of light. The light receptor receives only the light from the rails at said measuring axis via the reflection mirror for light reception and then the slit in said receptor. In the light receptor a deviation of the reference measuring points indicated by movement of the bright spot or band during the running of the track inspection car along the track is detected; and by comparing the deviation with the position of said reference measuring points when the rails are in the correct position, the rail displacement can be measured.

9 Claims, 15 Drawing Figures

METHOD AND APPARATUS FOR OPTICAL METHOD OF MEASURING RAIL DISPLACEMENT

This invention relates to a method and apparatus for optically measuring displacement of rails of a track.

BACKGROUND OF THE INVENTION AND PRIOR ART

A conventional track inspection car used for measurements of rail displacement, in order to measure track gauge deviation or mis-alignment of the rails, has several sets of gauge measuring wheels which can be pressed against the sides of the rails by a spring mechanism. Rail displacement, track gauge deviation or track mis-alignment is measured by measuring the lateral displacement of the measuring wheels of the track inspection car as it moves in the longitudinal direction of the rails. In such a conventional track inspection car, however, when the running speed gets as high as 160 km/h or more, the measuring wheels fail to follow the rails, resulting in a decrease of the measuring accuracy. In addition, the structure of this device is complicated, the weight is great, and much time and labor are necessary for maintenance and inspection of the device. Moreover, since the measuring wheels and accessories have to be installed outside of the main body or frame of the vehicle, e.g. below the vehicle frame, the safety of the inspection car during its movement along the rails is not guaranteed.

OBJECT AND BRIEF SUMMARY OF THE INVENTION

It is the object of the present invention to eliminate the drawbacks of the conventional track inspection method and apparatus by adoption of a non-contact measurement system based on optical principles instead of the conventional physical contact type measurement in which the lateral displacement of rails is measured in terms of the lateral displacement of measuring wheels pressed against the inner sides of rails. By the method and apparatus of the present invention, accurate, rapid measurements of rail displacement, track gauge deviation and misalignment can be carried out by a track inspection car.

This object is achieved by an optical track measuring method and apparatus according to the invention in which a light projector with a slit plate, a reflection mirror for light projection, a reflection mirror for light reception, and a light receptor with a slit plate are installed at specified intervals in the longitudinal direction of the rails on the underside of the body of a track inspection car. The light projector, the reflection mirror for light projection, the reflection mirror for light reception and the light receptor are arranged so that the light emitted from the light source in the light projector passes through the slit and, being reflected by the reflection mirror for light projection, directed onto a measuring axis connecting the points as to which measurement is being made on the opposed rails which constitute the tract at at least one of the rails to form a bright spot or band of light at the measuring point on the rail. The light receptor receives only the light from the rail at said measuring axis via the reflection mirror for light reception and the slit in the receptor. In the light receptor, a deviation of the points indicated by movement of the bright spot or band due to deviation of the rail position is detected during the running of the track inspection car along the track; and by comparing the deviation with the position of said reference measuring points when the rails are in the correct position, the rail displacement, the track gauge deviation and the misalignment can be measured.

According to the present invention, the light projector, the reflection mirror for light projection, the reflection mirror for light reception and the light receptor are preferably mounted on a measuring stand. The top side of said measuring stand is connected through a linkage to a displacement measuring means on the underside of the car; and both sides of light-measuring stand are provided with an anti-vibration rubber monitoring means by which the stand is mounted within a measuring frame which is pin-connected to the insides of two equalizing beams fixed between the front and rear wheel journal boxes on the right side and left side in the direction of travel of the track inspection car.

The objects, features and advantages of the present invention will become apparent from the following detailed description taken in conjunction with the attached drawings.

DESCRIPTION OF THE PREFERRED EMBODIMENT

For non-contact measurement of rail displacement, several available means are conceivable, such as radio waves, sound waves, changes in electric capacity or in inductance. Radar or sonar which utilizes radio waves or sound waves are suitable for measuring relatively large differences in distances, but are unfit for measuring small differences in distance, such as variations in track gauge. Changes in electric capacity or inductance have been needed for such measurements. Usually, however, when, for example, the track gauge deviation is to be measured, specified spots on the inner sides of opposed rails constituting the track, say, spots 14 mm below the rail tread surface are chosen as the measuring points, and a change in the distance between these points is compared with the standard track gauge to measure deviation. For this purpose, a sensor has to be located on the measuring axis connecting the measuring points on opposed rails; and this means that the sensor is located out of the main body or frame of the vehicle. Thus, the safety of the track inspection car equipped with such a sensor during running along the track will be unsatisfactory.

Figure 1A:
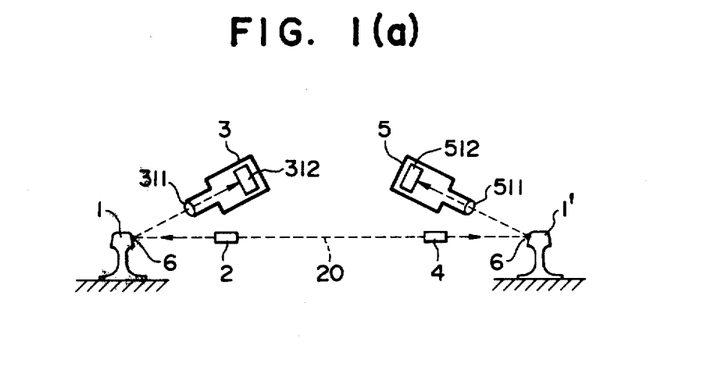
FIGS. 1(a) and 1(b) are diagrammatic front views of one example of means for optically measuring rail displacement.

For the purpose of carrying out non-contact measurement of the rail displacement by an optical method, it is conceivable that light projectors 2 and 4 as illustrated in FIG. 1(a), could be positioned on an imaginary measuring axis 20 connecting the measuring points 6 on the opposed rails 1 and 1' which constitute the track. The light from said light projectors 2 and 4 directed along said measuring axis 20 toward the measuring points 6 could be received on light-receiving elements 312 and 512 through lenses 311 and 511 of light receptors 3 and 5 installed in the car above the sensors, and thereby the rail displacement could be measured as a distortion of the image appearing on said elements. In such a method, the light is projected from the light projectors 2 and 4 located on the measuring axis along the measuring axis 20 onto the rails at measuring points 6 only, no matter what the lateral displacement of rail. In this respect the method provides an accurate measurement of the displacement of the rails, but it is not free from the same drawback as the methods utilizing changes in electric capacity or inductance, namely that because the light projectors 2 and 4 are on the measuring axis 6 they are unavoidably outside of the vehicle body and frame.

Figure 1B:
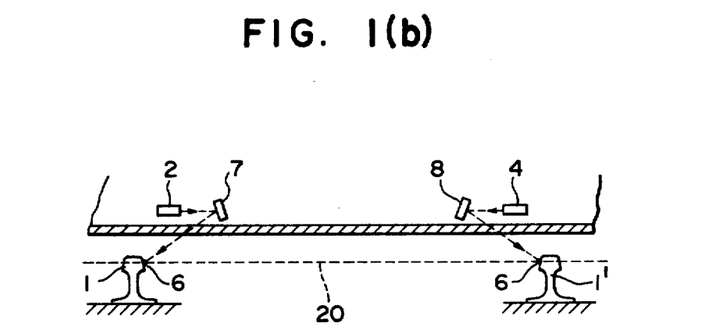

To avoid this, it is conceivable that, as illustrated in FIG. 1(b), the light projectors 2 and 4 can be located within the vehicle and the light can be projected obliquely from the light projectors 2 and 4 via the reflection mirrors 7 and 8 onto the measuring points 6. Reflected light could then be received by light receptors located within the vehicle via reflection mirrors, not shown. According to this arrangement, since the light projectors 2 and 4 and the light receptors would be within the vehicle, there would be no such drawback regarding the safety of the vehicle during running, as is the case for the arrangement as illustrated in FIG. 1(a).

However, because the light projectors 2 and 4 are off the measuring axis, in the absence of any rail displacement, the light from the projectors 2 and 4 may hit the measuring points 6, but if there is some lateral displacement of rails, the light from the projectors 2 and 4 will not always hit the measuring points 6. It is more likely that the light will strike the rails at points offset from the measuring points 6, thereby making the measurement of rail displacement inaccurate or even impossible.

According to the present invention, the above-disclosed drawbacks inherent in the non-contact optical measurement of rail displacement can be easily eliminated.

The working principle of the present invention will be explained with reference to FIG. 2(a).

A light projector 9 converts the light from a lamp 16 through a condenser lens 15 a slit plate 14, and a lens 13 and the light is reflected by a reflector 10 onto the measuring axis 20 connecting the measuring points 6, set, say at 14 mm below the rail tread surface, on the opposed rails. The length of the slit in plate 14 is such that the light falls on more than one point on rail 1. Meanwhile, a light receptor 12 consisting of a light-receiving element 19, a slit plate 18, and lens 17 receives the flux of converged light alone reflected from a reflector 11 directed toward said measuring axis.

In the above arrangement of the light projector 9 and the light receptor 12, if a narrow plate for reflecting the light is installed in alignment with the measuring axis 20, and the relative positions of the light projector 9 and the light receptor 11, the light source 16 and the width of the slit in the slit plate 14 in the light projector 9, the inclination of the slit plate 14, and the relative positions of the light-receiving element 19, the lens 17 and the reflection mirror 11 in the light receptor 12 are so adjusted that the light from the light projector 9 is converged only onto said narrow plate, the light converged on said narrow plate is reflected and received by the light receptor 12. When the light is projected from the light projector 9 with said narrow plate omitted, the light is converged only onto the measuring axis 20 and the light receptor 12 can receive only the light at the measuring axis.

Figure 2A:
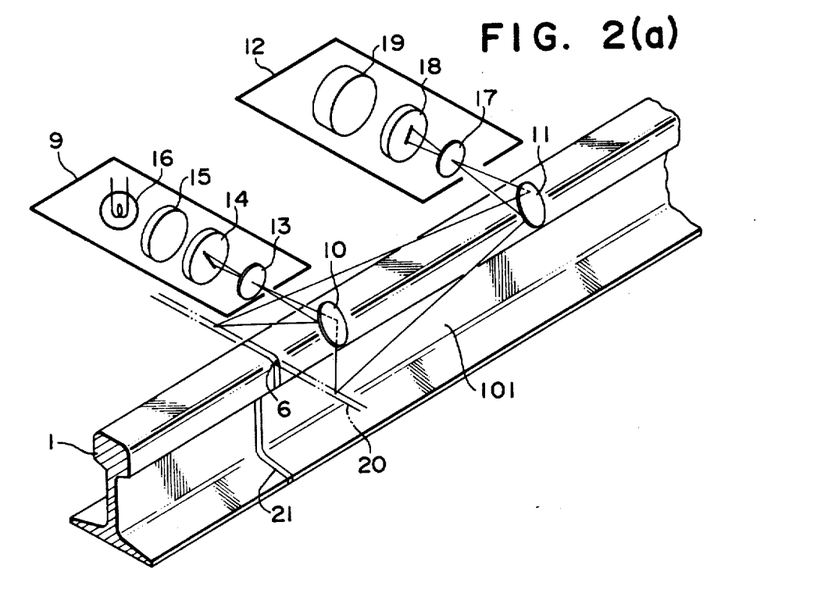
FIG. 2(a) is a diagrammatic oblique view of explaining the operating principle of the present invention.
Figure 2B:
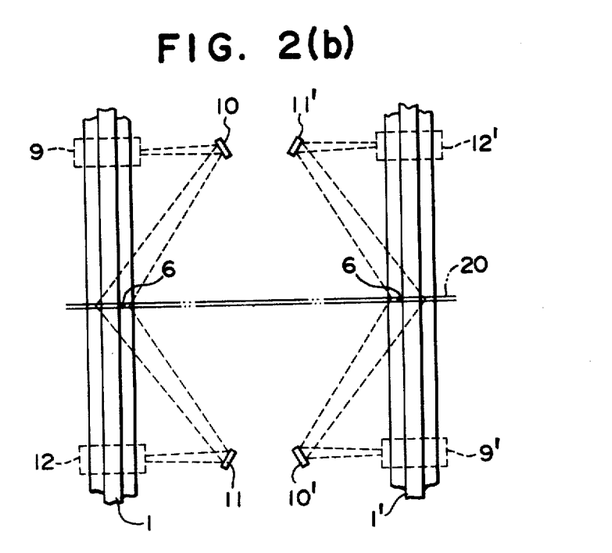
FIG. 2(b) is a diagrammatic plan view for explaining the basic idea behind the present invention which is based on the principle illustrated in FIG. 2(a).

Since the measuring axis 20 is actually an imaginary line, in reality the light projected on one side 101 of rail 1 in FIG. 2(a) will, in the absence of any object shielding the light at said measuring axis, pass the measuring axis 20 and fall at 21 on the side of the rail. On the other hand, since the rail tread surface is located, say, 14 mm above the measuring point and the measuring point 6 just beneath the rail tread surface is not exposed, the light projected from the light projector 9 toward the rail tread surface will, before being converged onto the measuring axis, hit the rail tread surface. Thus, the phenomen occurs that the light from the light projector falls, as illustrated at 21 in FIG. 2(a), onto the rail tread before it converges at the measuring axis 20 and onto the rail side after it converges at the measuring axis 20. The effect of this is to produce a spot or narrow band of intense light at measuring point 6 on the rail.

In the same way, the light which has passed the measuring axis 20 will fall onto the ballast adjacent to the rails, too. Namely, according to the present invention, the light from the light projector 9 is converged at the measuring axis 20, but it also falls onto places other than the measuring axis. The most important thing, however, is that according to the present invention, the light from the light projector 9 is always converged in alignment with the measuring axis. It should be understood that the measuring axis, as described herein, is a line connecting the measuring points on the rails which constitute the track, and in practice, is an area along the measuring axis with a finite width in the transverse direction, i.e. in the longitudinal direction of the rails. Therefore, even if the rail is laterally displaced, the measuring points 6 on the rails 1 will invariably fall within said area of the measuring axis, i.e. the portion of the line along which the light from projector 9 converges. In other words, the measuring points 6 will always be somewhere on the measuring axis where the light from the light projector converges.

Meanwhile, as described above, the light receptor 12 is positioned such that it can receive only the light from the light projector 9 which is formed into the bright spot or band on the point 6 on the rail which lies on the measuring axis 20. Therefore, the light receptor 12 will not receive the light which hits the rail tread without reaching the measuring axis 20 or the light which passes the measuring axis 20 and falls onto the rail side of the ballast, because this light is not reflected at the measuring axis 20; i.e. the light receptor 12 will receive only light reflected from the measuring points which are always located somewhere on the measuring axis 20.

For the light receptor 12 to be able to receive only light reflected from points lying on the measuring axis 20, the conditon must exist that the light-receiving plane of the light receptor 12 and the light-projecting plane of the light projector 9 are out of alignment. Otherwise, the light receptor 12 will also receive the light which has passed the measuring axis and is reflected back past the measuring axis instead of receiving only the light reflected at the measuring axis. Accordingly, the light receptor 9 and the light projector 12 must be positioned one after the other with respect to the measuring points 6 in the longitudinal direction of rails so that the light receptor 12 will receive only the light from the light projector 9 which is projected onto the measuring axis.

If, in the above arrangement, there is no vertical displacement of the light receptor 12 and the light projector 9 during the run of the track-inspection car, it will be possible to detect always and accurately the lateral displacement of rails by this non-contact method, said light receptor 12 and said light projector 9 detecting lateral movement of said bright spot or band at the measuring point 6 along the axis 20.

According to the arrangement illustrated in FIG. 2(a), accurate measurement of rail displacement is possible because both the light projector 9 and light receiver 12 can be disposed within the vehicle body or frame and the lateral displacements of the rails can be expressed in terms of shifts of the measuring points on the measuring axis.

A specific embodiment of the present invention based on the above idea is shown in FIGS. 3(a)-7(b).

Figure 3A:
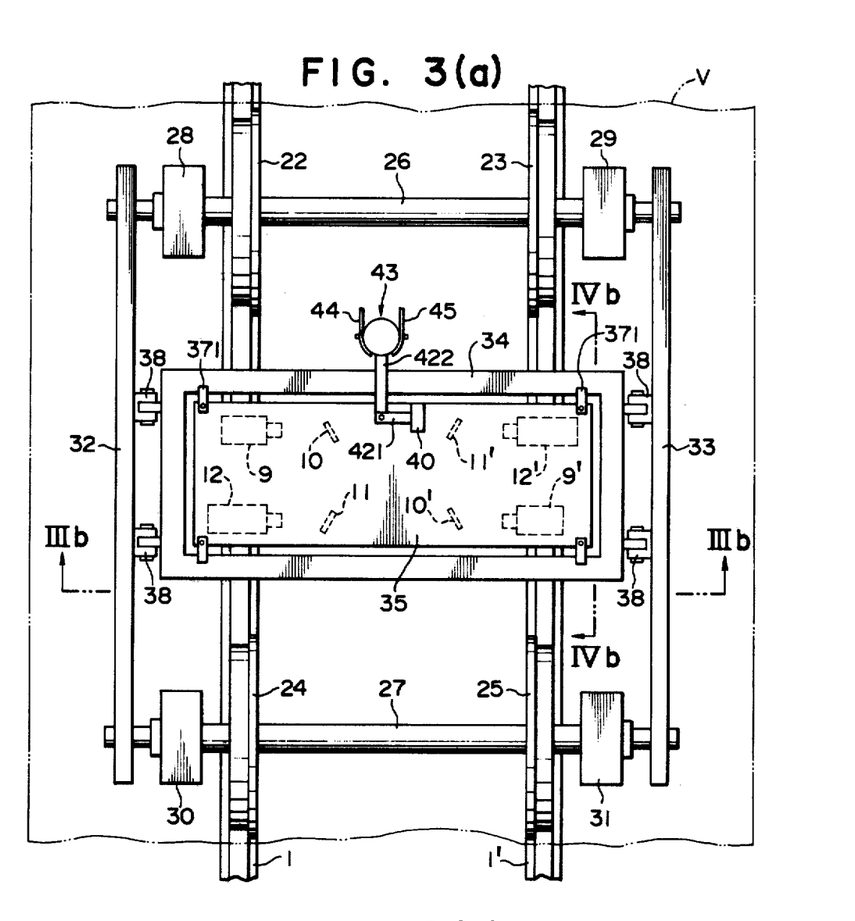
FIG. 3(a) is a plan view of an embodiment of the apparatus of the present invention.
Figure 3B:
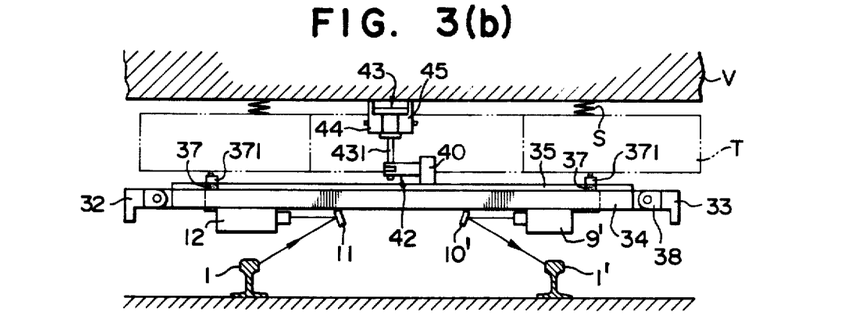
FIG. 3(b) is a sectional view taken along 3-b-3b in FIG. 3(a).

Body V of the track inspecting car is supported by springs S on truck T, which in turn is supported by further springs S on journal boxes 28-31.

In FIGS. 3(a) and 3(b), an equalizer beam 32 is provided which has the respective ends fixed to the jouranl boxes 28 and 30 of the wheels 22 and 24 on one side of the car in the direction of travel of the track inspection car V, while an equalizer beam 33 is provided, which has the respective ends fixed to the journal boxes 29 and 31 of the wheels 23 and 25 on the other side of the car.

Figure 4A:
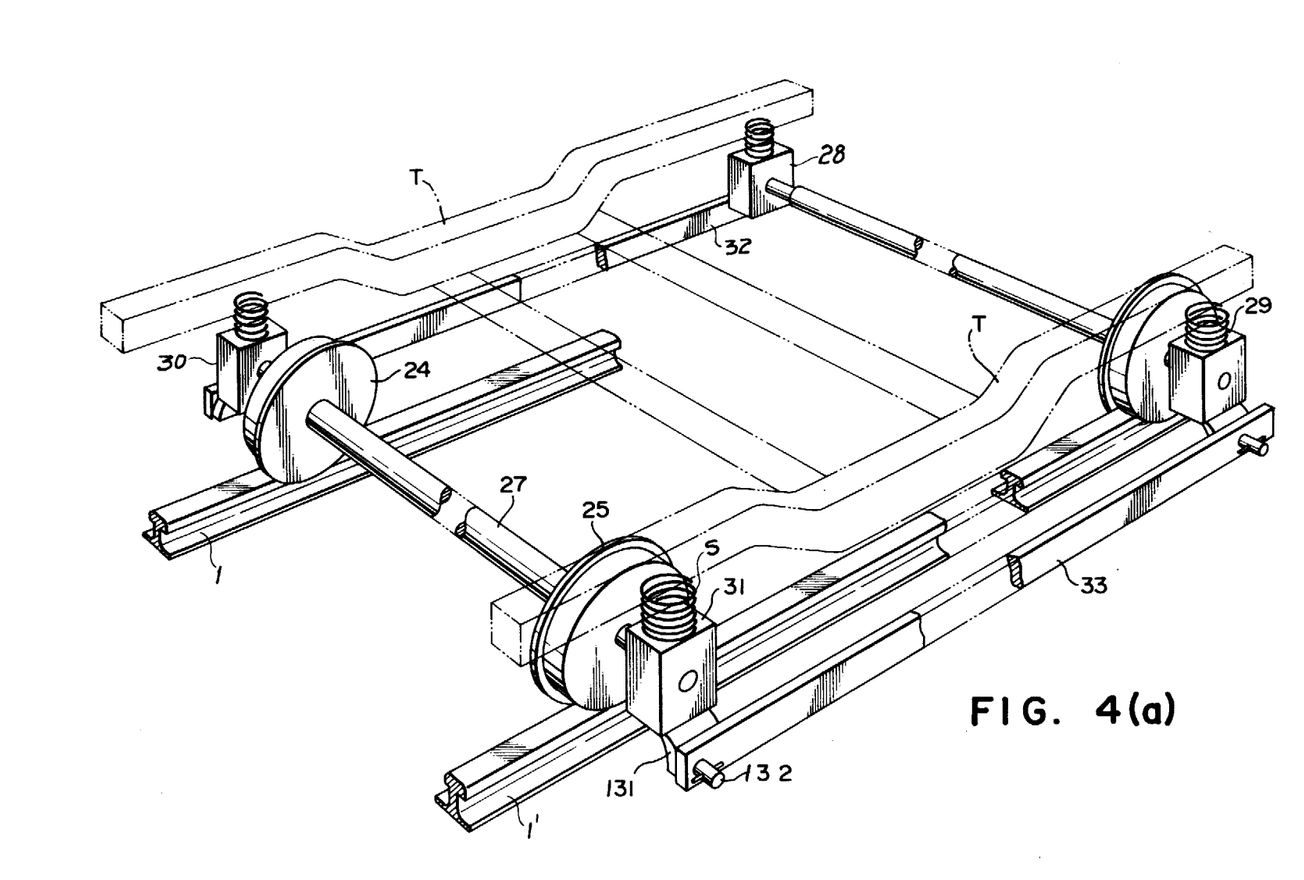
FIG. 4(a) is a perspective view illustrating an equalizer beam such as shown in FIGS. 3(a) and 3(b) fixed to the journal box.

A specific mode of fixing the ends of the equalizer beams 32 and 33 to the journal boxes is illustrated in FIG. 4(a). A metal piece 131 is fitted to the bottom of the journal box 31. The outside of said metal piece 131 and the inside of one end of equalizer beam 33 are fixed together by means of a connecting rod 132 running through them, the other end of the equalizer beam 33 being similarly fixed to the bottom of the journal box 29. The equalizer beam 33 is thus maintained over its entire length parallel to the tread of the rail 1' at a constant distance in the vertical direction from the tread of rail 1'.

Similarly an equalizer beam 32 is connected between the journal boxes 28 and 30, with the same contant distance in the vertical direction between the tread of the rail 1 and beam 32 as the distance between the beam 33 and the tread of rail 1'.

Figure 4B:
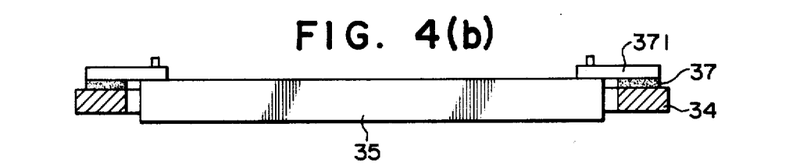
FIG. 4(b) is a sectional view taken on line 4b-4b in FIG. 3(a).

Between said equalizer beams 32 and 33 is pivotally mounted on pins 38 on the inside of beams 32 and 33, a measuring frame 34 which is a hollow rectangle as viewed from above. Inside of the hollow rectangle of said measuring frame 34 is mounted a rectangular measuring stand 35 which follows the contour of said hollow rectangle. A specified gap is maintained between the insides of the frame members of said measuring frame 34 and the opposed outer wall of said measuring stand 35. As illustrated in FIG. 4(b), the top side of the measuring frame 34 is located slightly below the top side of the measuring stand 35. At specified spots on the top side edge of the measuring stand 35 are mounted connecting plates 371 which extend outwardly from said edge; and the bottom sides of outwardly jutting portions of said connecting plates 371 and the opposed top side of the measuring frame 34 are connected by a vibration absorber 37 of anti-vibration rubber. By this arrangement, the measuring stand 35 and measuring frame 34 move only laterally with the wheels and axles 26 and 27 and do not move vertically, so that the light from light projector 9 will always converge on axis 20.

Figure 4C:
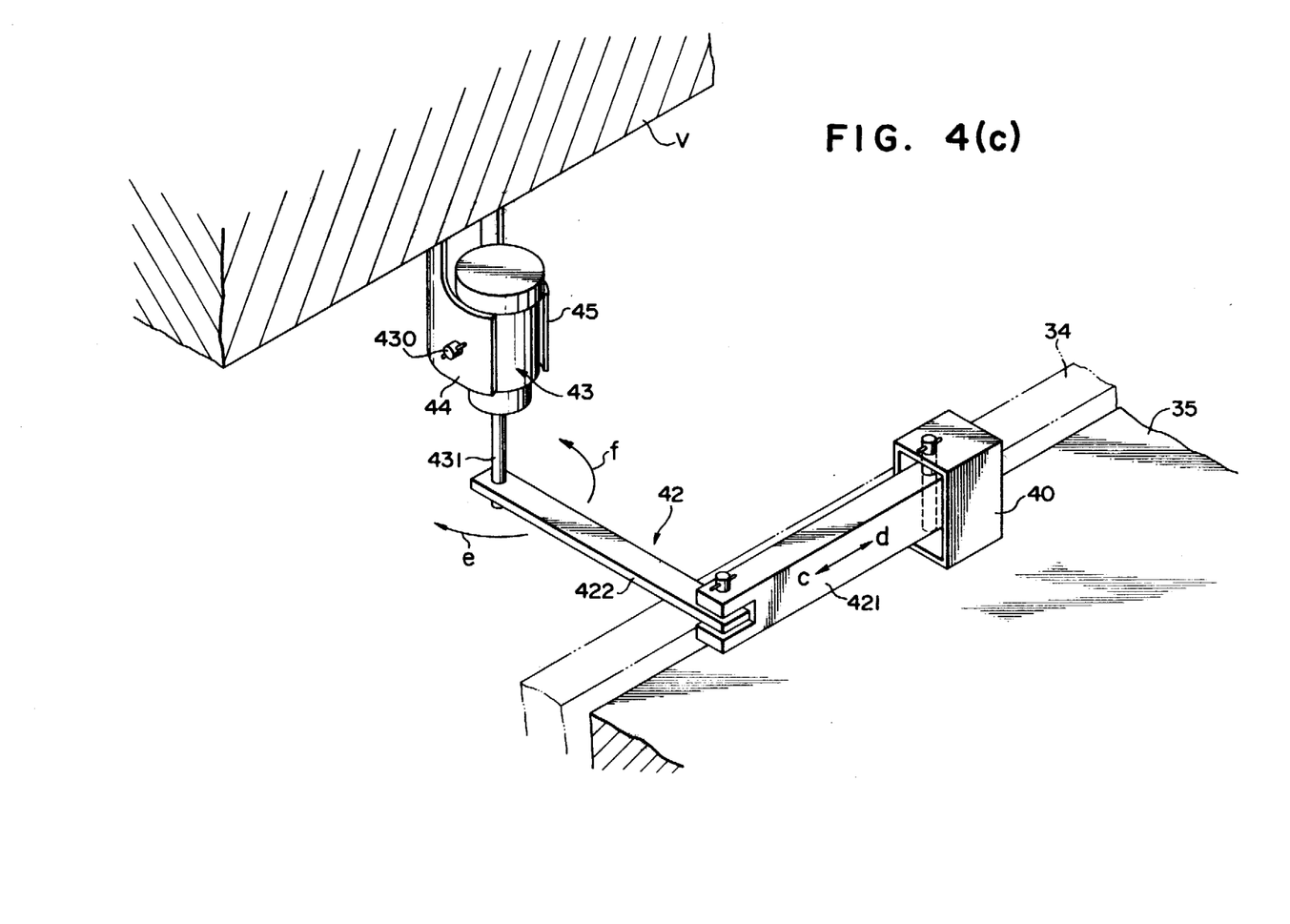
FIG. 4(c) is a perspective view of the detection mechanism for detecting the lateral displacement of the measuring stand relative to car body.

As shown in FIGS. 3(a), 3(b) and 4(c), a connecting piece 40 is mounted at a specified position on the top surface of measuring stand 35 adjacent to the central axis thereof in the longitudinal direction of the rails 1 and 1'. At a specified point on the central axis in the direction of travel of the bottom of the car body V is mounted a detector 43 between support pieces 44 and 45 and held by a connecting member 430, which detects the lateral deviation of the measuring stand 35 relative to the central axis of the car body in the direction of travel during travel of the car. Said connecting piece 40 and said detector 43 are coupled via a linkage 42.

Figure 4D:
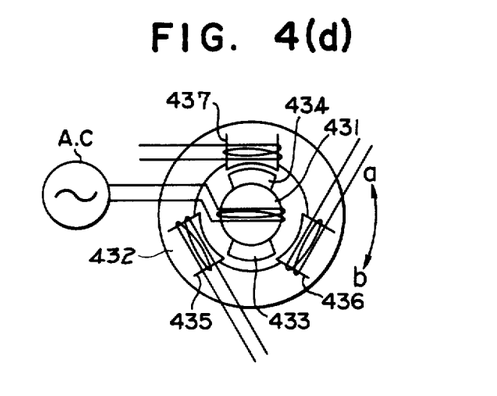
FIG. 4(d) is a sectional plan view of the angle-detector in FIG. 4(c).

For detection of the lateral displacement of the measuring stand relative to the central axis of the car body V during the run of the track inspection car, a detector of prior art may be used in the present invention. A detector of prior art for accomplishing this purpose will be briefly described in connection with FIG. 4(d). In FIG. 4(d), a movable piece 431 in the form of a solid cylindrical body is mounted in a fixed hollow cylindrical body 432. Said movable piece 431 has two poles 433 and 434 diametrically opposite each other on the upper portion of the piece 431, and which are connected to an AC source. On the inside of fixed body 432 are poles 435-437 at equal intervals around the circumference thereof. Upon rotation of the movable piece 431, the poles 433 and 434 move relative to the poles 435-437 on the fixed body 432 with a specified gap between the opposed poles. The lower portion of the movable piece 431 protrudes from the bottom of the detector 43 for with this arrangement, when the movable piece 431 rotates from the set position through a specified angle, for instance, in the direction as shown by arrow "a" or "b", as is well known the output voltages of the poles 435, 436 and 437 on the fixed body will change in a sine-wave fashion. Thus if the dimensional relations between the poles 433 and 434 on the movable piece 431 and the poles 435-437 in the fixed body 432 and the gaps between the poles 433 and 434 and the poles 435-437 are appropriately set, the direction of rotation and the angle of rotation in that direction of the movable piece 431 can be detected by measuring the output voltages of the poles 435-437 by measuring means of the prior art.

In FIG. 4(c) when the measuring stand 35 makes a lateral movement relative to the car body V, the connecting piece 40 will also be laterally displaced and at the same time the member 421 of the linkage 42 will move in the direction of arrows c-d.

Since one end of the member 422 of the linkage 42 is fixed to the lower end of the movable piece 431 in the detector 43, while the other end thereof is pivotally connected to the end of the member 421 the displacement of the member 421 in the direction c-d causes the member 422 to swing in the direction of arrows e-f around the lower end of the movable piece 431 as a center, so that the movable piece 431 rotates.

Therefore, if the positional relationships between the members 421 and 422 of the linkage 42 and the movable piece 431 are proper, by measuring the output voltage of the poles 435-437 in the fixed body 432, the lateral displacement of the measuring stand 35 relative to car body V can be detected.

As is described from the above, according to the present invention the frame 34 is pivotally connected by pins 38 between the inner sides of the equalizer beams 32 and 33, the ends of the beams being fixed to the journal boxes 28 and 30 and 29 and 31, respectively, while the measuring stand 35 coupled to the body V via the linkage 42 is integrally connected via the vibration absorbers 37 with said measuring frame 34. Under this arrangement, when the car runs on the rails, the measuring stand 35 can be displaced in the lateral direction of the rails 1 and 1' relative to the truck T and car body V, but cannot be displaced in the vertical direction.

As shown in FIGS. 3(a) and 3(b), on the underside of the measuring stand 35 along the left rail 1 is mounted a light projector 9 and a light receptor 12 at points spaced in the direction along the left rail. As shown in FIG. 2(a), the light projector 9 is composed of the light source 16, the condenser lens 15, the slit plate 14 and the lens 13, while the light receptor 12 is composed of the light-receiving element 19, the slit plate 18 and the lens 17. A light receiving reflection mirror 11 is mounted on the bottom of the measuring stand 35 in line with the light receptor 12 at a position inside the left rail, while a light transmitting reflection mirror 10 is mounted on the bottom of the measuring stand 35 in line with the light projector 9 at a position inside the left rail. The positional relationships of the components of the light projector 9 and the light transmitting reflection mirror 10 are such that the light from the light source 16 having a width and length corresponding to the dimensions of the slit 14 is reflected by the mirror 10 after passing through the slit 14 and the lens 13, which converges the light on the measuring axis 20 connecting the measuring points 6, say at 14 mm below the rail tread surface on the opposed rails 1 and 1'. Because the light projector 9 is located on the bottom of the measuring stand 34 along the left rail and the reflection mirror 10 is located inside of the left rail, the light from the light projector 9 is converged on the measuring axis 20 with a certain width corresponding to that of the slit 14 and forms a bright spot or band at the measuring point 6 on the left rail. The light receiving reflection mirror 11 aligned with the light receptor 12 receives only the light converged on said measuring axis, which is very bright where it strikes the rail 1 at the measuring axis 20 as compared with where it strikes the rail at the other points and the track bed. The light received by the reflection mirror 11 is focused by the lens 17 and then received through the slit 18 on the light-receiving element 19.

The width of the slit 14 is made suitable for the width of the light which is ultimately converged onto the measuring axis 20 from the light source 16 of the light projector. Depending on the specific requirements, the width of the light is such that the light converged onto the measuring axis 20 is as narrow and as intense as possible. When the light on the measuring axis 20 is spread out not only is clarity lost, but also the measuring axis itself appears broader than necessary, thereby resulting in an inaccurate measurement. In order to detect the position of the measuring point 6, accurately, the slit 18 in the light receptor 12 is given the same width as the slit in the light projector.

On the bottom of the measuring stand 35 along the right rail 1' and at points spaced in the direction of the length of the rail are a light projector 9' and the light receptor 12' having the same construction as the light projector 9 and the light receptor 12. A light transmitting reflection mirror 10' the same as the reflection mirror 10 is aligned with the light projector 9', and a light-receiving reflection mirror 11' the same as the reflection mirror 11 is with the light receptor 12. The relationships of these elements are the same as those of the light projector 9 and the light receptor 10 located along the left rail 1. The light from the light projector 9' is converged via the slit, the condenser lens and the reflector 10' onto the measuring axis at the reference point of the right rail. The reflection mirror 11' aligned with the light receptor 12' receives only the light converged on said portion of the measuring axis at the reference point, this reception taking place on the light-receiving element 19 of the light receptor 12' via the lens and the slit.

In the above-described embodiment, the relative positions of the light projector and the light receptor in the direction of the length of the rail are reversed for the right rail as compared with the left rail. However, this is not always necessary, and the object of the present invention will be equally well achieved even when the light projector and the light receptor are in corresponding positions along both the left side and the right side of the track inspection car.

With this arrangement, when the track inspection car V is operated with light being emitted from the light sources of the light projectors 9 and 9', the light from light projectors 9 and 9' is respectively converged from the reflection mirrors 10 and 10' onto the portions of the measuring axis where it intersects the left rail and the right rail. Since the light projectors 9 and 9', the light receptors 12 and 12' and the reflection mirrors 10 and 10' and 11 and 11' are symmetrically mounted on the bottom of the measuring stand 35 in relation to the longitudinal axis of the rail at any specific moment during the movement of the track inspection car along the track, the portion of the measuring axis on which the light is converged toward the left rail by the light projector 9 and the portion of the measuring axis toward which the light is converged in the direction of the right rail constitute the points of the measuring axis, respectively, intersecting the opposed rails constituting the track. Meanwhile, as described with reference to FIG. 2(a), the light receptors 12 and 12', respectively, receive only the light from the bright spot or base on the measuring point on the corresponding rail and any shift of the measuring points due to the lateral displacement of the rail must take place along said measuring axis. Thus, by detecting the shift of the measuring points in the light receptors and comparing said shift with the positions of the measuring points when the rails are in the proper position, the rail displacement can be measured and from this the track gauge deviation and misalignment can be measured.

A specific arrangement for detecting the shift of the rail measuring point, the track gauge deviation and misalignment according to the present invention is illustrated in FIGS. 5–7(b).

Figures 5A, 5B:
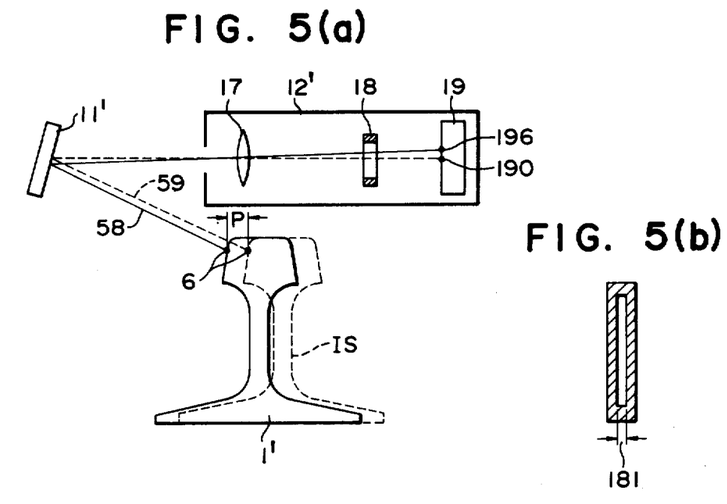
FIG. 5(a) is a diagrammatic front view illustrating an example of the lateral rail displacement detection mechanism provided in the light receptor.
FIG. 5(b) is a side view of the slit 18 of the mechanism shown in FIG. 5(a).

FIG. 5(a) shows the case in which the light from the light projector 9' is converted at the measuring point 6 of the right rail 1' and this light converged on the measuring point 6 is reflected to the reflection mirror 11' and thereby onto the light receptor 12'. In this case, the solid-line representation of the right rail 1' having the measuring point 6 is assumed to be shifted from the normal, correct rail position, indicated by the dotted line 1S, to the left in FIG. 5(a) a distance P. When said rail portion is in the normal position, the light from the light projector (not shown) at the rail measuring point 6 is directed along axis 59 in the normal position and is received and reflected by the reflection mirror 11', the focus lens 17' and the slit 18 and falls on the point 190 on the light-receiving element 19. When the rail 1' is shifted to the left by the distance P from the normal position, the light from the light projector is directed from point 6 along axis 58 and received at 196 on the light-receiving element via the reflection mirror 11', the lens 17 and slit 18. Therefore the distance between the points 190 and 196 on the light-receiving element represents the rail displacement.

Figure 6:
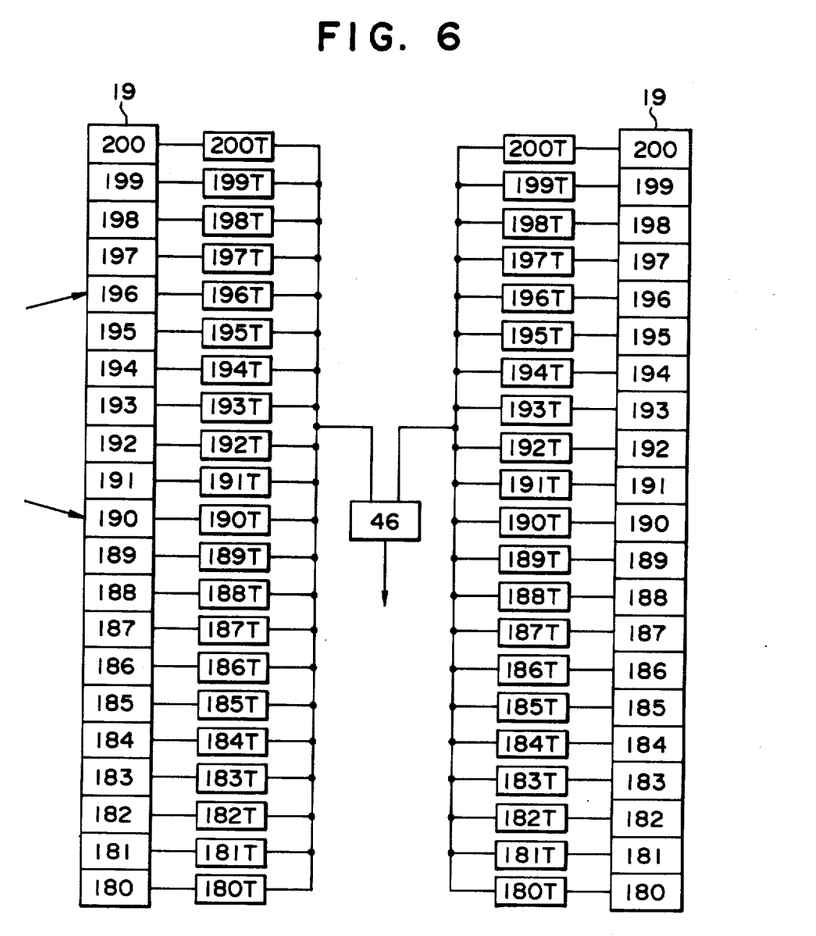
FIG. 6 is a diagram of a circuit for measuring the track gauge deviation according to the present invention.

FIG. 6 illustrates a mechanism for estimating the amount of said rail displacement. As seen in FIG. 6, the light-receiving element 19 in FIG. 4(a) is an array of photodiodes conventional in the prior art. Said array consists of a plurality of parallel photodiodes 185–200 and transistor circuits 185T–200T connected to each photodiode in said array. The photodiodes 185–200, when exposed to a projected light, each develop a different output voltage, but when not exposed to light, they yield no output. These outputs are each connected to a transistor circuit which produces a specific voltage when it receives an output from from the corresponding photodiode. With the photodiodes 185–200 and corresponding transistor circuits 185T–200T, arranged in this way, when the rails are in the normal positions, the light reflected from the measuring point on the rail falls on, say, the photodiode 190 in the light-receiving element 19. The output of said photodiode 190 is supplied to the transistor circuit 190T connected therewith, and said transistor 190T is caused to yield an output reference voltage. As the measuring point 6 shifts, say, rightward with a rightward displacement of the rail, the position of the light which is reflected from the measuring point 6 and received by the light receptor is moved so as to fall on one or more diodes 190–200, while leftward displacement of rail causes leftward shift of the measuring point 6 and as a consequence the position of the light which is reflected from the measuring point and received by the light receptor is moved so as to fall on one or more photodiodes 189–185 depending on the extent of the shift of the measuring point. The output voltage per diode relative to diode 190 may be +d or −d depending on the relative position, above or below, the photodiode 190. For example, if the reference voltage of transistor 190T when the diode 190 receives the light is D, the output of the transistor 190T for the diode can be D+d, and that of transistor 190T for 192D+2d, and so on. If the distance between the diodes 185 and 200 in the light-receiving element 19 is appropriately selected relative to the rail displacement, the rail displacement can be expressed by the output of the transistor connected to the photodiode exposed to the light. Thus, the track gauge deviation can be measured by detecting the rail displacement from the output of the light-receiving element 19 in the light receptor 9 and the output of the light-receiving element 19 in the light receptor 9' in FIGS. 3(a) and 3(b) and feeding said displacement into a voltage adding means from the prior art. That is, the output of the light receptor 9 and the output of the light receptor 9' are added in a voltage adding means 46 to detect the track gauge deviation.

Figure 7A:
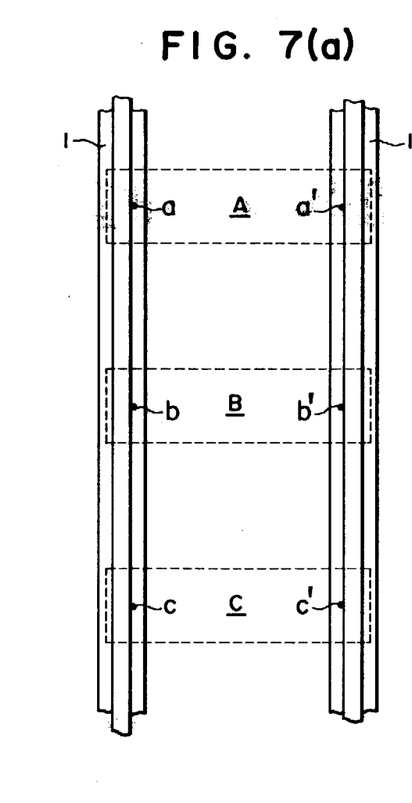
FIG. 7(a) is a plan view for explaining the measurement of mis-alignment by the "mid-chord-system".
Figure 7B:
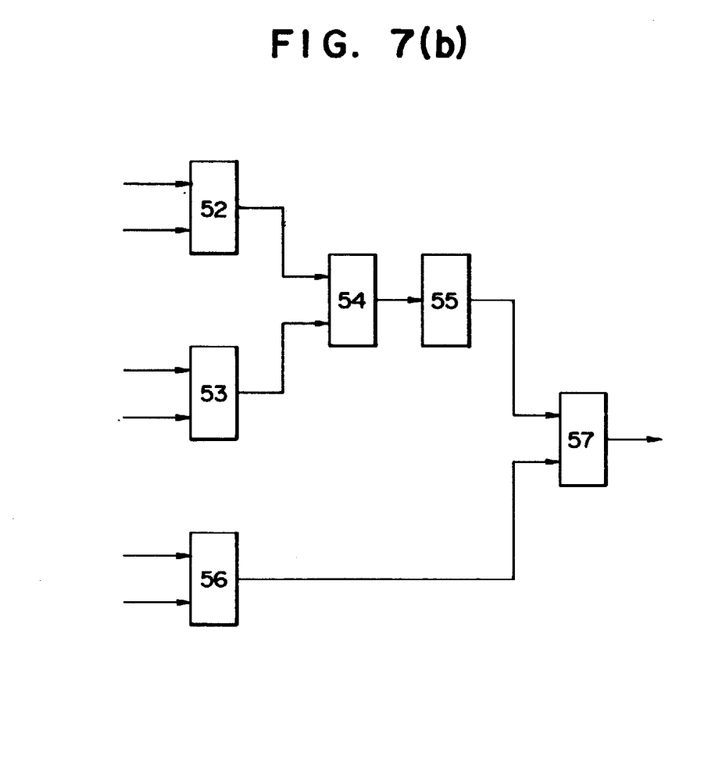
FIG. 7(b) is a schematic circuit diagram of a circuit for measuring mis-alignment by the "mid-chord-system" according to the present invention.

In FIGS. 7(a) and 7(b) is illustrated an example of measuring the misalignment by the "mid-chord system" or "mid-ordinate-to-chord system", using the present invention. In such a system, three equidistant points are selected along the reference line on the longitudinal axis of the track. One half of the sum of the rail displacements at the first and third of said points are added to and are also substracted from the rail displacement at the second point. The result is taken to be the misalignment at the second point. For this purpose the track inspection car is equipped, as shown in FIG. 7(a), with the three units A, B, C of displacement measuring devices. Each displacement measuring device is just the same as shown in FIGS. 3(a) and 3(b). It comprises the measuring frame 34, measuring stand 35, light projectors 9 and 9', light receptors 12 and 12', reflection mirrors 10 and 11 and 10' and 11', and the detector 43 arranged in the same way as in FIGS. 3(a) and 3(b), and these displacement measuring devices A, B, C are mounted between equalizer beams the same as the equalizer beams 33 and 32 in FIGS. 3(a) and 3(b) at equal intervals in the direction of car travel.

Then as described with reference to FIGS. 3(a) and 3(b), the displacement measuring devices A-C detect the lateral shift of the track at three points, say, points a-c, on the rail 1.

Meanwhile using the detector 43 of the prior art as described with reference to FIGS. 3(a) and 3(b) and FIGS. 4(c) and 4(d), the lateral displacement of the measuring stand 35 for each displacement measuring device at the time of detection is measured. In this case, detector 43 is so constructed that the relation of the output voltage to the extent of the displacement is just the same in the detector 43 and the displacement measuring devices A-C. Next, the shift of the point "a" on the rail 1 as measured by the displacement measuring device A and the lateral deviation of the measuring stand carrying said device A from the central axis of the car body V as measured by the detector, and the shift of the point "c" on the rail 1 is measured by the device C and the deviation of the measuring stand carrying said device C from the central axis of the car body as measured by the detector are respectively supplied to adding means 52 and 53, as shown in the circuit of FIG. 8(b). Thereupon, the outputs of the adding means 52 and 53 are supplied to adding means 54 to be added. The added deviations are then supplied to a dividing means 55 to be divided by 2. On the other hand, the displacement measuring device B measures the lateral shift of the point "b" on the rail 1. The detector 43 thereof measures the lateral deviation of the displacement measuring stand 35 in said device from the central axis of car body, and the shift of said point "b" and the lateral deviation of the displacement measuring stand are added in the adding means 56 and the result is supplied the subtracting means 57, to which is also supplied the output of said dividing means 55. Thus, the mis-alignment at the second point 13 can be calculated by subtracting the output of the dividing means 55 from the output of the adding means 56 in the subtracting means 57.

In the same way, the mis-alignment at the second point B' on the right rail can be detected.

With the displacement measuring means according to the present invention:

(1) Rail displacement, track gauge deviation or misalignment can be measured by a non-contact method. Therefore unlike the conventional method, there is absolutely no likelihood of the measuring wheels failing to follow the rails during high speed measurement, and the speed of the track inspection car can be increased to about 200 km/h.

(2) Unlike the conventional method of non-contact measurement, which necessitates installation of equipment outside of the vehicle body and frame which greatly decreases the safety of the track inspection car, during high speed operation, the equipment of the present invention can be easily installed within the vehicle body and frame, and the lateral displacements of the rails can always be measured as the lateral shifts of measuring points, thereby assuring accurate and reliable measurement of rail displacement.

What is claimed is:

1. Apparatus for optically measuring rail displacement of the rails of a track, comprising a light projector means for mounting on the truck of a railway car above the level of said track for only lateral movement with said truck, said light projector means having a light source and being positioned to direct the light toward one of the rails, the light projector means shaping the light from the light source into a beam which is converged on a measuring axis connecting the points on the sides of the heads of the rails of the track as to which displacement measurement is being made and along a length of the measuring axis which includes the position of the measuring point on the side of the head of said one rail with said one rail in the proper position, the light falling on the side of the head of said one rail at said measuring point in a bright spot or band of light, a light-receiving means for mounting on said truck out of alignment with the axis of the beam of light from said light projector means for receiving an image for sensing the shift of position of the image of the bright spot or band, and comparison means coupled to said light receiving means for comparing the shift of the position of the image with the normal position of said image for determining the amount of shift of said one rail.

2. Apparatus for optically measuring rail displacement of the rails of a track comprising a light projector for mounting on the truck on a railway car above the level of said track for only lateral movement with said truck, said light projector having a light source, a slit plate and lens means aligned therewith, a light-transmittal reflecting mirror for mounting on said truck aligned with said projector and positioned to reflect the light from said projector toward one of the rails, the slit plate and lens means shaping the light from the light source into a beam which, when reflected from said light-transmittal reflecting mirror, is converged on a measuring axis connecting the points on the sides of the heads of the rails of the track as to which displacement measurement is being made and along a length of the measuring axis which includes the position of the measuring point on the side of the head of said one rail with said one rail in the proper position, the light falling on the side of the head of said one rail at said measuring point in a bright spot or band of light, a light-receiving reflecting mirror for mounting on said truck out of alignment with the axis of the beam of light from said light-transmittal reflecting mirror for receiving an image of the bright spot or band on the measuring point on the side of the head of said one rail, a light receptor for mounting on said truck aligned with said light-receiving reflecting mirror for receiving the image of the bright spot or band, said light receptor having a slit plate corresponding to the slit plate in said light projector and a lens means and a means for sensing the shift of position of the image of the bright spot or band positioned to receive the image from said slit plate and lens means, and comparison means coupled to said means for sensing for comparing the shift of the position of the image with the normal position of said image for determining the amount of shift of said one rail.

3. An apparatus as claimed in claim 1 further comprising a measuring stand means for mounting on said truck for only lateral movement with said truck, said light projector and light receptor and said reflecting mirrors being mounted on said measuring stand means at points spaced in the direction of the length of the track.

4. An apparatus as claimed in claim 3 further comprising a means for sensing rotational motion adapted to be mounted on a railway car, and articulation means connected between said rotational motion sensing means and said measuring stand means for translating lateral movement of said measuring stand means with said truck relative to the railway car during movement of said railway car along the track into rotational motion, whereby the output of said rotational motion sensing means can be used to sense the lateral shift of said track relative to a reference line.

5. An apparatus as claimed in claim 3 in which said truck has journal boxes at the ends of the axles of the wheels on said truck, and said measuring stand means comprises equalizer beams rigidly mounted between two journal boxes on opposite sides of said truck in the direction of travel of the truck along the track, a measuring frame pivotally mounted between opposite equalizer frames around horizontal pivotal axes, a measuring stand mounted in said measuring frame, and vibration absorbing means mounting said measuring stand in said measuring frame with the edges of the measuring stand spaced from said measuring frame.

6. Apparatus as claimed in claim 2 further comprising a further light projector for mounting on the truck above the level of said track for only lateral movement with the truck, said further light projector having a light source, a slit plate and a lens means aligned therewith, a further light-transmittal reflecting mirror for mounting on said truck aligned with said further light projector and positioned to reflect the light from said further light projector toward the other of said rails, the slit plate and lens means of the further light projector shaping the light from the light source thereof into a further beam which when reflected from said further light-transmittal reflecting mirror is converged on the measuring axis at the point of intersection with the side of the head on said other rail and along a length of the measuring axis which includes the position of the intersecting point on the side of the head of said other rail with said other rail in the proper position, the light falling on the side of the head of said other rail at said intersecting point in a bright spot or band of light, a further light-receiving reflecting mirror for mounting on said truck out of alignment with the axis of the further beam of light for receiving an image of the bright spot or band on the intersecting point on the side of the head of said other rail, a further light receptor for mounting on said truck aligned with said further light-receiving reflecting mirror for receiving the image of the bright spot or band on the side of the head of said other rail, said further light receptor having a slit plate corresponding to the slit plate in said further light projector and a lens means and a means for sensing the shift of position of the image of the bright spot or band positioned to receive the image from said slit plate and lens means, and further comparison means coupled to said means for sensing in the further light receptor for comparing the shift of the position of the image there with the normal position of the image for determining the amount of shift of said other rail.

7. A method for optically measuring rail displacement of the rails of a track, comprising shaping light into a beam and then directing it toward one of the rails at a point at which the displacement measurement is to be made, the light being shaped into a beam which is converged on a measuring axis connecting the points on the sides of the heads of the rails of the track as to which measurement is being made and along a length of the measuring axis which includes the position of the measuring point on the side of the head of said one rail with said one rail in the proper position, the light falling on the side of the head of said one rail at said measuring point in a bright spot or band of light, sensing the movement of the bright spot or band of light along said measuring axis while moving the beam of light along the rail, and comparing the changed position of the spot or band of light with the normal position of the measuring point to determine the displacement of the rail.

8. A method as claimed in claim 7 in which the step of directing the beam of light toward said one rail comprises reflecting it from a mirror, and the step of sensing the movement of the bright spot or band comprises picking up the image of the bright spot or band in a mirror and reflecting it into a light sensing means.

9. A method as claimed in claim 7 further comprising shaping light into a further beam and directing the further beam toward the other rail at the point at which said measuring axis intersects the side of the head of said other rail, the light being shaped into the further beam which is converged on the measuring axis and along a length thereof which includes the position of the intersecting point on the side of the head of said other rail with said other rail in the proper position, the light falling on the side of the head of said other rail at said intersecting point being in a bright spot or band of light, sensing the movement of the lastmentioned bright spot or band of light along said measuring axis while moving the further beam of light along the other rail, and comparing the changed position of the lastmentioned spot or band of light with the normal position of the intersecting point to determine the displacement of said other rail.

* * * * *